(No Model.)
V. SPICER & J. SCHREUDER.
SIGNAL FOR RAILWAYS.
No. 372,578. Patented Nov. 1, 1887.
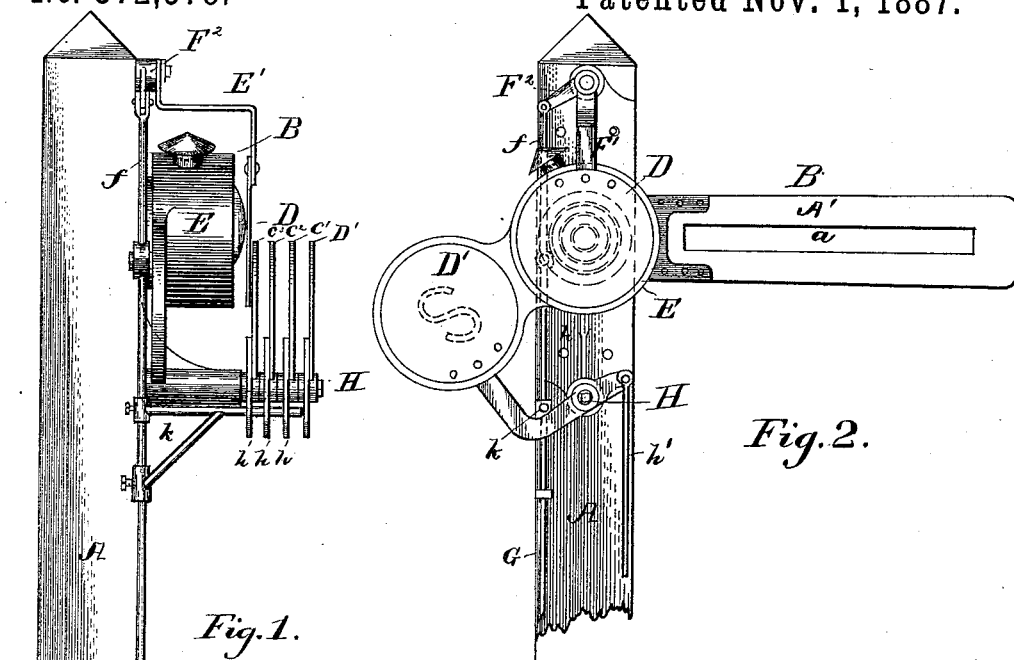
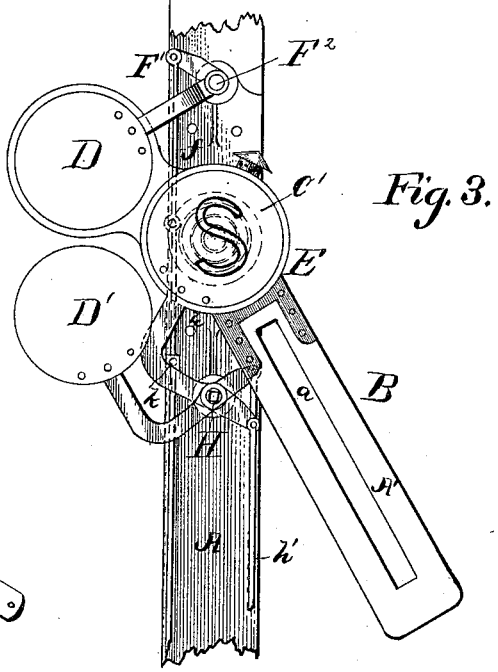
Witnesses:
Inventor.

UNITED STATES PATENT OFFICE.

VIBE SPICER AND JENS SCHREUDER, OF PITTSBURG, PENNSYLVANIA.

SIGNAL FOR RAILWAYS.

SPECIFICATION forming part of Letters Patent No. 372,578, dated November 1, 1887.

Application filed June 26, 1886. Renewed April 12, 1887. Serial No. 234,530. (No model.)

*To all whom it may concern:*

Be it known that we, VIBE SPICER, a citizen of the United States, and JENS SCHREUDER, a subject of the King of Norway, residing at Pittsburg, in the county of Allegheny and State of Pennsylvania, have invented certain new and useful Improvements in Signals for Railways; and we do hereby declare the following to be a full, clear, and exact description of the invention, reference being had to the accompanying drawings, which form part of this specification.

This invention has relation to semaphore and route-indicating signals for railways, and pertains especially to signals of the class referred to in an application for Letters Patent of the United States filed by us the 10th day of December, 1885, Serial No. 185,367, wherein we have shown and described an illuminated semaphore-signal consisting, essentially, of a hollow swinging arm having a glass screen or window through which the light is reflected, and having a lamp located within a hollow pivotal casting and arranged to illuminate the interior of the swinging arm.

A swinging and illuminated arm constitutes a feature of our present invention and enters into constructions with other devices; hence the semaphore described in our said application may be accepted as the proper type of illuminated swinging arm which we employ.

Our present invention, however, has reference, mainly, to what are termed "route-indicating signals." The semaphore-signal consisting of the swinging arm is used, chiefly, to indicate the general condition of "safety" and "danger," according to its position, and on a direct line, where there are no sidings or switches in the neighborhood, will indicate all that is required. Route-signals, however, are necessary, and are employed where there are branch lines, switches, or sidings, so that it may be known which route is open when the swinging arm indicates the general condition of safety. Heretofore route-signals, when attached to the signal-post and used as supplementary indicators in connection with the swinging arm, have been located some distance below the danger or safety signal, and have consisted of a series of disks so arranged that upon opening a particular route a disk corresponding to such route is swung in front of a lantern, which illuminates the disk, and thus indicates that the particular route or line is open and safe. The location and general arrangement of the route-disks have rendered them imperfect not only during the day, but particularly at night, when the semaphore-signal has been generally invisible or faintly perceptible. At best it is necessary for the engineer to observe both signals—the swinging arm and the route-disk—and while these have been disconnected and practically isolated from each other proper observation has been difficult and uncertain.

Our invention has for its object to further utilize the swinging arm by combining with it and bringing into close relation therewith the route-indicating signals, so that while a more convenient and reliable arrangement of the cooperating and corelated signals is obtained than under the systems now in use, a better and more economical signal apparatus is provided, the same light which is used to illuminate the swinging arm being utilized to illuminate or display the route-signal.

Our invention therefore consists, first, in the combination, with an illuminated semaphore-signal, of one or more route-signals or indicating-disks so arranged as to be illuminated by the same light which illuminates the semaphore; second, the combination, with an illuminated semaphore-signal consisting of a hollow internally-illuminated swinging arm having a lamp located in its pivotal casting or hub-casing and the latter provided with a lens, bull's-eye, or glass side, of one or more route-disks and suitable mechanism for bringing said disk or disks in front of the light; third, in the novel construction, combination, and arrangement of devices and mechanism herewith described and claimed.

Referring to the accompanying drawings, Figure 1 is a side elevation of a signal-post and of our improved signal devices supported thereon. Fig. 2 is a face view or front elevation with the signal-arm at "danger" or horizontal. Fig. 3 is a similar view with the signal-arm lowered or at "safety."

A designates the signal-post; B, the signal-arm; C C', &c., the route-disks, and D D' the shields.

The signal-arm is preferably of the general form and construction of the signal-arm shown and described in our application already referred to, the body A' of the arm consisting of a hollow box-like casting having its face covered or closed by a pane of glass, a, through which the light is reflected and diffused, the source of light being a lamp or its equivalent located within the hollow hub E, swiveled or hung upon the signal-post in the usual manner. For the purpose of our present invention we provide the hollow hub E with an opening in its face and set therein a lens or plate of glass, through which the light from the lamp will be reflected, and by which, if a lens or bull's-eye be used, the rays will be concentrated.

When the signal-arm is at "danger"—that is, set horizontally, as shown in Fig. 2—the light through the side of the hub is hidden by an opaque disk or screen, D, which is attached to the lower end of an arm, F', secured to or forming one limb of a bell-crank, F², which is secured to the signal-post, the other limb of the bell-crank being pivoted to a vertical rod, f, which, when the signal-arm is lowered, is raised and causes the disk D to be swung to one side, so as to expose the light from the hub. When the signal-arm is raised, a reverse motion takes place, the shield instantly falling in front of the illuminated hub and screening it from view.

Below the hub E is a horizontal spindle, H, which supports the route-disks, their V-shaped sustaining-arms h being hung pivotally thereon and connected, respectively, to the vertical rods h', &c., from which the disks are operated from the several switches to which they relate. A disk-shield, D', is also supported upon the spindle H, but is stationary, always remaining in front of the route-disk not in use. Each route-disk is related to a particular branch or siding, and, as usual, consists of a plate of metal having an open or stenciled letter or number representing the route which it is intended to indicate.

When a disk is swung in front of the illuminated hub E, the light therefrom displays the number or figure through which it passes. If desired, the disk may be made principally of glass; or the stenciled letter or figure portion d may be covered with the glass, either transparent or translucent. In their normal position the route-disks lie back of and out of line with the hub-light and are prevented from being swung into sight until the signal-arm is lowered to "safety" by the stop-rod k, carried by the signal-operating rod G and extending out above the disk-arm h.

For the purpose of insuring absolute safety it is requisite that the route indication be postponed till the main signal is lowered; but in practice the slide upon which the route-signal rod h' rests is first shifted by the movement of the switch, so that the rod h' may drop without obstruction when the disk is released from the stop-rod k. The siding being opened, the main signal is then lowered, whereupon the proper disk is swung into position in front of the illuminated hub.

The mechanism for operating the disks and main signal need not be shown or described, as we employ expedients for this purpose now in use.

The restoration of an exposed disk to its normal position takes place by lifting of the main signal, the rod G being drawn down, causing the stop-rod k to press upon the disk-arm and force it downward and outward.

The details of our invention may be varied in many ways, and hence we do not limit ourselves to the specific mechanism herewith shown and described.

Having described our invention, what we desire to claim and secure by Letters Patent is—

1. In a semaphore signaling apparatus, the combination, with a swinging illuminated signal-arm adapted to indicate "danger" or "safety" or equivalent conditions, of one or more route signals or disks arranged, substantially as described, so as to be illuminated from the same source of light as the signal-arm.

2. In semaphore-signals, the combination, with an internally-illuminated swinging signal-arm adapted to indicate "danger" or "safety" or equivalent conditions, of an illuminated hub or swiveled lamp-casing to which said arm is attached, and one or more route disks or signals adapted to be illuminated or displayed by the light of said lamp, substantially as described.

3. In semaphore-signals, the combination, with a swinging signal-arm capable of being illuminated interiorly at night by the light of a lamp, of one or more route-disks constructed and arranged, substantially as described, so as to be displayed by the same light.

4. In semaphore-signals, the combination, with a swinging signal-arm and a hub or lamp-casing having a transparent or light-exposing side or wall connected therewith, of one or more route disks or signals constructed, arranged, and adapted to be displayed by the light of said lamp.

In testimony that we claim the foregoing we have hereunto set our hands this 25th day of June, 1886.

VIBE SPICER.
     JENS SCHREUDER.

Witnesses:
 A. A. MOORE,
 JNO. F. ATCHESON.